United States Patent
Ivanovic et al.

(10) Patent No.: US 11,997,275 B2
(45) Date of Patent: May 28, 2024

(54) BENEFIT-BASED BITRATE DISTRIBUTION FOR VIDEO ENCODING

(71) Applicant: ATI TECHNOLOGIES ULC, Markham (CA)

(72) Inventors: Boris Ivanovic, Markham (CA); Mehdi Saeedi, Markham (CA)

(73) Assignee: AT Technologies ULC, Markham (CA)

(*) Notice: Subject to any disclaimer, the term of this patent is extended or adjusted under 35 U.S.C. 154(b) by 0 days.

(21) Appl. No.: 16/113,302

(22) Filed: Aug. 27, 2018

(65) Prior Publication Data
US 2020/0068197 A1   Feb. 27, 2020

(51) Int. Cl.
H04N 11/02   (2006.01)
H04N 19/124   (2014.01)
H04N 19/154   (2014.01)

(52) U.S. Cl.
CPC ......... H04N 19/124 (2014.11); H04N 19/154 (2014.11)

(58) Field of Classification Search
CPC .................................................. H04N 19/124
USPC ....................................... 375/240.01–240.29
See application file for complete search history.

(56) References Cited

U.S. PATENT DOCUMENTS

| | | | |
|---|---|---|---|
| 6,208,699 B1 * | 3/2001 | Chen .................. | H04L 1/20 375/340 |
| 6,879,723 B1 | 4/2005 | Helman | |
| 7,095,787 B2 | 8/2006 | Kanodo et al. | |
| 7,184,100 B1 * | 2/2007 | Wilf .................. | G11B 27/28 348/700 |
| 8,090,212 B1 * | 1/2012 | Baxansky .............. | H03F 3/217 382/260 |
| 8,724,698 B2 | 5/2014 | Lin | |
| 9,420,091 B2 * | 8/2016 | Shaffer ................ | H04W 4/16 |
| 9,445,094 B2 * | 9/2016 | Kobayashi ............ | H04N 19/60 |
| 9,445,110 B2 * | 9/2016 | Leontaris .............. | H04N 19/80 |

(Continued)

FOREIGN PATENT DOCUMENTS

CN   103828369   5/2014
JP   2011-514056   4/2011
(Continued)

OTHER PUBLICATIONS

International Search Report and Written Opinion dated Nov. 25, 2019 for International Application No. PCT/IB2019/055341, 10 pages.

(Continued)

Primary Examiner — Leron Beck (57) ABSTRACT

A multimedia system allocates, during encoding of a multimedia stream, bits to portions of frames based on quality metrics and bit usages for different quantization parameters (QPs). An encoder of the multimedia system encodes a frame in a first pass with a first QP and in a second pass with a second QP. A comparator of the multimedia system measures and compares quality metrics, such as mean squared error, for each portion of the frame encoded with the first QP and the second QP. The comparator compares the difference between the quality metrics for each portion encoded with each QP to a threshold. If the difference in quality metrics for a portion exceeds the threshold, the comparator selects the portion for inclusion in a subset of portions to be encoded with the second QP.

20 Claims, 6 Drawing Sheets

(56) References Cited

U.S. PATENT DOCUMENTS

| | | | |
|---|---|---|---|
| 10,244,266 B1* | 3/2019 | Wu | H04N 19/86 |
| 2004/0028139 A1* | 2/2004 | Zaccarin | H04N 19/176 |
| | | | 375/240.24 |
| 2005/0186554 A1* | 8/2005 | Temov | G06K 9/0014 |
| | | | 435/4 |
| 2007/0139564 A1* | 6/2007 | Boroczky | H04N 17/004 |
| | | | 348/626 |
| 2007/0280349 A1* | 12/2007 | Prieto | H04N 19/124 |
| | | | 375/240.03 |
| 2008/0260042 A1* | 10/2008 | Shah | H04N 19/197 |
| | | | 375/240.25 |
| 2008/0262242 A1 | 10/2008 | Walter et al. | |
| 2008/0304562 A1* | 12/2008 | Chang | H04N 19/159 |
| | | | 375/240.03 |
| 2009/0148058 A1* | 6/2009 | Dane | H04N 5/145 |
| | | | 382/251 |
| 2010/0046621 A1* | 2/2010 | Horiuchi | H04N 19/134 |
| | | | 375/240.12 |
| 2011/0007138 A1* | 1/2011 | Zhang | G06T 17/00 |
| | | | 348/50 |
| 2011/0007270 A1 | 1/2011 | Sarver et al. | |
| 2011/0007798 A1 | 1/2011 | Pun et al. | |
| 2012/0039389 A1 | 2/2012 | Sjoberg et al. | |
| 2013/0190600 A1* | 7/2013 | Gupta | A61B 8/0866 |
| | | | 600/410 |
| 2013/0322524 A1 | 12/2013 | Jang et al. | |
| 2014/0215017 A1* | 7/2014 | Yeh | H04L 65/4084 |
| | | | 709/219 |
| 2014/0376616 A1* | 12/2014 | Li | H04N 19/124 |
| | | | 375/240.03 |
| 2015/0124870 A1* | 5/2015 | Novotny | H04N 19/176 |
| | | | 375/240.03 |
| 2015/0124871 A1* | 5/2015 | Cohen | H04N 19/159 |
| | | | 375/240.03 |
| 2015/0157200 A1* | 6/2015 | Sarver | A61B 3/1015 |
| | | | 351/205 |
| 2016/0234496 A1* | 8/2016 | Panda | H04N 19/124 |
| 2017/0374375 A1* | 12/2017 | Makar | H04N 19/126 |
| 2018/0309995 A1* | 10/2018 | He | H04N 19/126 |
| 2019/0019579 A1* | 1/2019 | Auvray | G06F 19/321 |

FOREIGN PATENT DOCUMENTS

| | | |
|---|---|---|
| JP | 2012104940 | 5/2012 |
| WO | 2009105732 | 8/2009 |

OTHER PUBLICATIONS

Partial European Search Report issued in Application No. 19854256.5 dated Jun. 20, 2022 16 pages.

Office Action issued in Japanese Application No. 2021-510314, dated Jun. 13, 2023, 17 pages.

Office Action issued in Indian Application No. 202117007197 dated Oct. 31, 2022, 6 pages.

Extended European Search Report issued in Application No. 19854256.5 dated Nov. 3, 2022, 16 pages.

Office Action mailed Jan. 5, 2024 for Chinese Application No. 201980054726.4, 6 pages.

* cited by examiner

BENEFIT-BASED BITRATE DISTRIBUTION FOR VIDEO ENCODING

BACKGROUND

A multimedia server generates data representative of pictures in a multimedia stream, e.g., a multimedia stream that has been requested by a user. An encoder of the multimedia server encodes the data for each picture to form a bitstream that is transmitted over a network to a decoder that decodes the bitstream and provides the decoded video information to a multimedia application or any other application for display to the user. Such multimedia encoders and decoders are used in a wide variety of applications to facilitate the storage and transfer of multimedia streams in a compressed fashion.

To compress multimedia streams, conventional encoders implement video compression algorithms in which the degree of compression depends in part on a quantization parameter. A higher quantization parameter often results in lower bit usage for a picture, whereas a lower quantization parameter often results in higher bit usage for the picture. Compression algorithms use different quantization parameters that allocate bits to titles, frames, slices, and blocks of pictures. However, bits are frequently allocated inefficiently within pictures by the compression algorithms due to applying a quantization parameter that is either too low or too high. If too low, the quantization parameter results in the unnecessary consumption of computing resources and bandwidth in encoding, transmitting, and decoding of pictures, without any commensurate benefit. If the quantization parameter is too high, the result is unnecessarily reduced quality of encoded pictures.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-8 illustrate systems and techniques for allocating, during encoding of a multimedia stream, bits to portions of frames based on quality metrics and bit usages for different quantization parameters (QPs). The portions of the frames to which bits are allocated include any part or all of a frame, such as macroblocks, coding tree blocks (CTBs), titles, and slices. For ease of reference, portions of frames are referred to herein as portions or macroblocks. An encoder of the multimedia system encodes a frame in a first pass with a first QP and in a second pass with a second QP. For purposes of the following description, the second QP is considered to result in more bits and better quality. A comparator of the multimedia system measures and compares quality metrics, such as mean squared error, for each portion of the frame encoded with the first QP and the second QP. The comparator compares the difference (improvement) between the quality metrics for each portion encoded with each QP to a threshold. If the difference in quality metrics for a portion exceeds the threshold, the comparator selects the portion for inclusion in a subset of portions to be encoded with the second QP.

In some embodiments, the comparator measures the bit usage of each portion encoded with the first QP and the second QP to determine how many additional bits are used to encode the portion with the second QP versus the first QP. The comparator selects portions for inclusion in a subset of portions to be encoded with the second QP based on at least one of the difference in quality metrics and the difference in bit usage.

In some embodiments, the multimedia system allocates bits to portions of images based on differences in pixel activities between portions. Many video processing algorithms such as those used for texture analysis calculate a metric such as pixel activity within portions of a frame. For example, pixel activity such as variations of pixel intensities within a portion may be used to detect edges, repeating patterns, and other structures or objects in an image. Pixel activity can be measured using various metrics such as, for example, using a gray-level co-occurrence matrix, a two-dimensional spatial mean gradient, wavelet or other transforms, discrete cosine function, or average value within a portion. Based on pixel activity within a portion, the comparator predicts whether the portion will benefit from encoding with the second QP. In some embodiments, the comparator selects portions for inclusion in the subset of portions to be encoded with the second QP at least in part on pixel activity, as explained in more detail below.

The comparator provides the encoder with an identification of portions for inclusion in the subset of portions to be encoded with the second QP. Based on the identification, the encoder encodes each portion of the frame with the first QP (if the portion was not selected for inclusion in the subset) or the second QP (if the portion was selected for inclusion in the subset). The encoder transmits the encoded frame over a network to a decoder that decodes the bitstream and provides the decoded video information to a multimedia application for display to the user.

Figure 1:
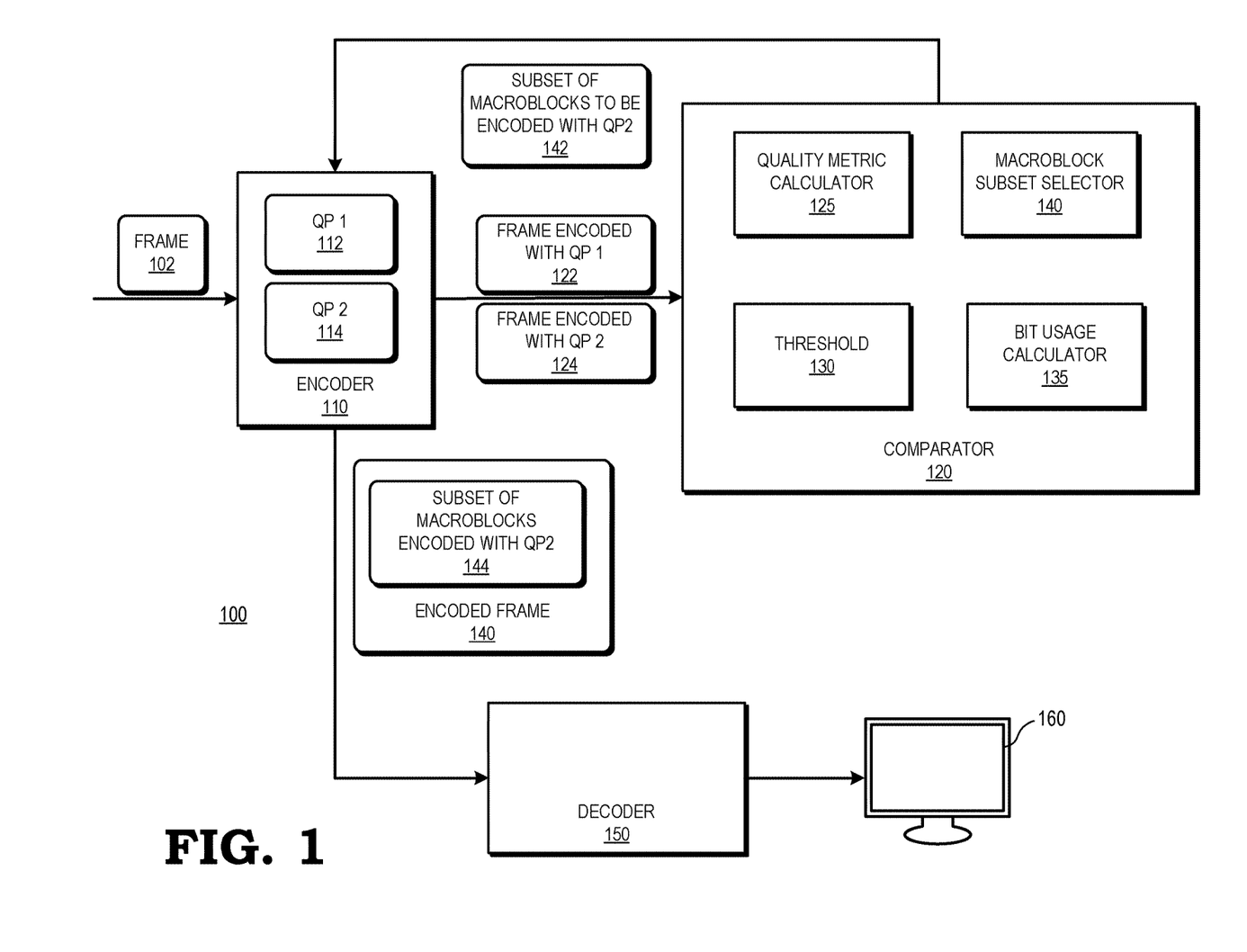
FIG. 1 is a block diagram of a multimedia system configured to allocate encoding bits to macroblocks of a picture based on quality metrics and bit usage in accordance with some embodiments.

FIG. 1 illustrates a block diagram of a multimedia system 100 including a comparator 120 configured to allocate encoding bits to blocks of a picture based on one or more of quality metrics and bit usage in accordance with some embodiments. The multimedia system 100 includes an encoder 110, the comparator 120, a decoder 150, and a display 160. In some embodiments, the multimedia system 100 is distributed across a variety of electronic devices, such as a server, personal computer, tablet, set top box, gaming system, mobile phone, and the like. The comparator 120 is implemented as, for example, processors executing software, programmable logic, hard-coded logic, or a combination thereof. The comparator 120 is implemented with or otherwise associated with a source device (not shown) that communicates with a destination device (not shown) to provide images for display at the display device 160.

The encoder 110 is configured to receive digital information that represents a stream or sequence of image frames such as frame 102 in a multimedia stream. The term "multimedia" refers to either video only or a combination of video and audio. The encoder 110 encodes the digital information for transmission over a communication channel such as a wide area network (WAN), an intranet, an Internet, a wireless network, and the like. For example, in some embodiments the encoder 110 is used to encode the digital information according to an encoding standard such as Moving Picture Expert Group ("MPEG")-2, MPEG-4, Advanced Video Coding ("AVC"), and the like. In some embodiments, the encoder 110 is a hardware encoder or software executed by the one or more processors.

The encoder 110 is configured to apply one or more QPs to encode a frame or a portion of a frame. The QP is an index used to derive a scaling matrix and regulates how much spatial detail of the image is preserved. For example, in an H.264 encoder, the QP ranges from 0 to 51. The lower the QP, the more detail is retained during encoding. As the QP increases, some detail is aggregated so that the encoding bit rate decreases, resulting in a loss of quality.

In the depicted example, the encoder 110 encodes the frame 102 in multiple passes, using a first QP 112 to encode the frame 102 during a first pass to generate a frame 122 encoded with the first QP 112 and using a second QP 114 lower than the first QP 112 to generate a frame 124 encoded with the second QP 114 during a second pass. Thus, the frame 124 encoded with the second QP 114 uses more bits than the frame 122 encoded with the first QP 112 and retains more spatial detail of the image.

The comparator 120 includes a quality metric calculator 125, a threshold 130, a bit usage calculator 135, and a macroblock subset identifier 140. The comparator 120 is configured to receive the frame 122 encoded with the first QP 112 and the corresponding frame 124 encoded with the second QP 114. The quality metric calculator 125 is configured to measure a quality metric of the frame 122 encoded with the first QP 112 and each macroblock of the frame 124 encoded with the second QP 114. In some embodiments, the method used by the quality metric calculator 125 to measure a quality metric is based on a mean squared error (MSE) of the frame 122 encoded with the first QP 112 and each macroblock of the frame 124 encoded with the second QP 114. The MSE is a measurement of the average of the squares of the differences between the encoded frames 122, 124 and the image frame 102. A higher MSE indicates that the encoded frame contains more errors with respect to the image frame 102. In some embodiments, the quality metric calculator 125 uses a method of measuring a quality metric based on how a viewer would perceive the quality of the video. The quality metric calculator 125 applies the same method of measuring quality metrics (e.g., based on MSE or some other measure of quality) to each of frame 122 and frame 124.

The quality metric calculator 125 is configured to divide the encoded frames 122, 124 into portions (for example, blocks of pixels such as macroblocks, slices, or titles) and to measure a quality metric of, for example, each macroblock of the frame 122 encoded with the first QP 112 and each macroblock of the frame 124 encoded with the second QP 114. Thus, the quality metric calculator 125 measures with a programmable granularity (i.e., per frame, per slice, per title, or per macroblock) the difference in quality for each part of the frames 102 when encoded with the first QP 112 versus the second (lower) QP 114.

The macroblock subset selector 140 is configured to compare the measured quality metric of each macroblock of the frame 122 with each corresponding macroblock of the frame 124 to determine a difference in quality for each macroblock when encoded with the first QP 112 versus the second QP 114. The macroblock subset selector 140 compares the difference in quality for each macroblock for each QP to the threshold 130. In some embodiments, the threshold 130 is preset. In some embodiments, the threshold 130 is dynamically adjusted. The dynamic adjustment is based, for example, on local area spatio-temporal measurements or models. One example is a metric or model that predicts the importance of the area to human perception or the human visual system, etc. In some embodiments, the current or predicted bit usage is a factor in the adjustment. If the macroblock subset selector 140 determines that the difference in quality for a given macroblock when encoded with the second QP 114 versus the first QP 112 exceeds the threshold 130, the macroblock subset selector 140 selects that macroblock for inclusion in a subset of macroblocks to be encoded with the second QP 114. The subset includes some, but not all, of the macroblocks of the frame 122.

The comparator 120 includes a bit usage calculator 135 configured to determine a difference in bit usage for each macroblock of the frame 122 encoded with the first QP 112 versus the frame 124 encoded with the second QP 114. Assigning a lower QP (i.e., more bits) to some macroblocks is likely to result in a greater improvement in MSE than for other macroblocks. The bit usage calculator 135 identifies the macroblocks that show the greatest improvement in MSE compared to the increase in bit usage when encoded with the second QP 114 versus the first QP 112. The macroblock subset selector 140 bases the selection of macroblocks for inclusion in the subset of macroblocks to be encoded with the second QP 114 in part on the identification by the bit usage calculator 135 of the macroblocks that show the greatest improvement in MSE (or other quality metric) compared to the increase in bit usage when encoded with the second QP 114 versus the first QP 112. The macroblock subset selector 140 compares the difference in bit usage for each macroblock of the frame 122 and the corresponding macroblock of the frame 124 to a threshold (not shown) to determine which macroblocks to include in the subset of macroblocks to be encoded with the second QP 114.

The comparator 120 provides the encoder 110 with an identification of the subset 142 of macroblocks to be encoded with the second QP 114. The encoder 110 encodes the subset 142 of macroblocks with the second QP 114 and encodes the remainder of macroblocks of the frame with the first QP 112 to generate encoded frame 140. Encoded frame 140 includes the subset 144 of macroblocks encoded with the second QP. The encoder 110 transmits the encoded frame 140 over a network (not shown) to the decoder 150. In some embodiments, the decoder 150 is implemented as a hardware decoder or a software decoder, e.g., as a set of executable instructions. The decoder 150 is configured to decode the encoded frame 140 and provide the decoded video information to a multimedia application or any other applications for display to the user at the display 160. It should be noted that any number of QPs could be used; that is, the number of QPs available to select from could be more than two. Even when there is only a choice of two, the two QPs that will be considered are subject to change within the picture based on metrics, models, and/or current/predicted bit usage.

To illustrate, in operation, the encoder 110 receives the frame 102 from a multimedia application (not shown). The encoder 110 encodes the frame 102 in a first pass with the first QP 112 and encodes the frame 102 in a second pass with the second QP 114 to generate encoded frame 122 encoded with the first QP 112 and encoded frame 124 encoded with the second QP 114. The encoder 110 provides encoded frame 122 and encoded frame 124 to the comparator 120.

The quality metric calculator 125 of the comparator 120 measures a quality metric for each macroblock (or slice or other part) of encoded frame 122 and encoded frame 124. The quality metric calculator 125 compares the quality metrics for each macroblock of encoded frame 122 and encoded frame 124 to determine a difference in quality metrics for each macroblock when encoded with the first QP 112 versus the second QP 114. In some embodiments, the bit usage calculator 135 calculates the bit usage for each macroblock of encoded frame 122 and encoded frame 124 to determine a difference in bit usage for each macroblock when encoded with the first QP 112 versus the second QP 114.

The macroblock subset selector 140 compares the difference in quality metrics for each macroblock when encoded with the first QP 112 versus the second QP 114 to the threshold 130. The macroblock subset selector 140 selects macroblocks for inclusion in a subset 142 of macroblocks to be encoded with the second QP based on whether the difference in quality metrics for each macroblock when encoded with the first QP 112 versus the second QP 114 exceeds the threshold 130. In some embodiments, the macroblock subset selector 140 selects macroblocks for inclusion in a subset 142 of macroblocks to be encoded with the second QP based at least in part on whether the difference in bit usage for each macroblock when encoded with the first QP 112 versus the second QP 114 exceeds a second threshold (not shown).

The macroblock subset selector 140 identifies to the encoder 110 the subset 142 of macroblocks to be encoded with the second QP 114. The encoder 110 encodes the frame 102 based on the identification of the subset 142 by encoding the subset 142 of macroblocks with the second QP 114 to generate the subset 144 of macroblocks encoded with the second QP 114 and by encoding the remainder of macroblocks of the frame 102 with the first QP 112 to generate the encoded frame 140. The encoder 110 transmits the encoded frame 140 over a network (not shown) to the decoder 150. The decoder 150 decodes the encoded frame 140 and provides the decoded video information to a multimedia application for display to the user at the display 160 or any other applications.

Although the above example is described with respect to two QPs, it will be appreciated that in some embodiments, the encoder 110 encodes the frame 102 using more than two QPs, each QP different from the other QPs. Further, in some embodiments, the first QP 112 is selected based on a history of QPs used to encode one or more frames preceding the frame 102. In some embodiments, the comparator 120 uses a mathematical, empirical or machine learning model to avoid computing the model with both the QPs that are being considered. A model or a machine learning system uses input data to predict the QP that is most likely more effective. Input data for a training/regression includes, for example, pixel data, the calculated pixel activities, other calculated metrics on local pixel samples (including summary statistics, mathematical transformations, etc.), the quality calculated at multiple QPs, motion information, quality of the motion information, etc.

Figure 2:
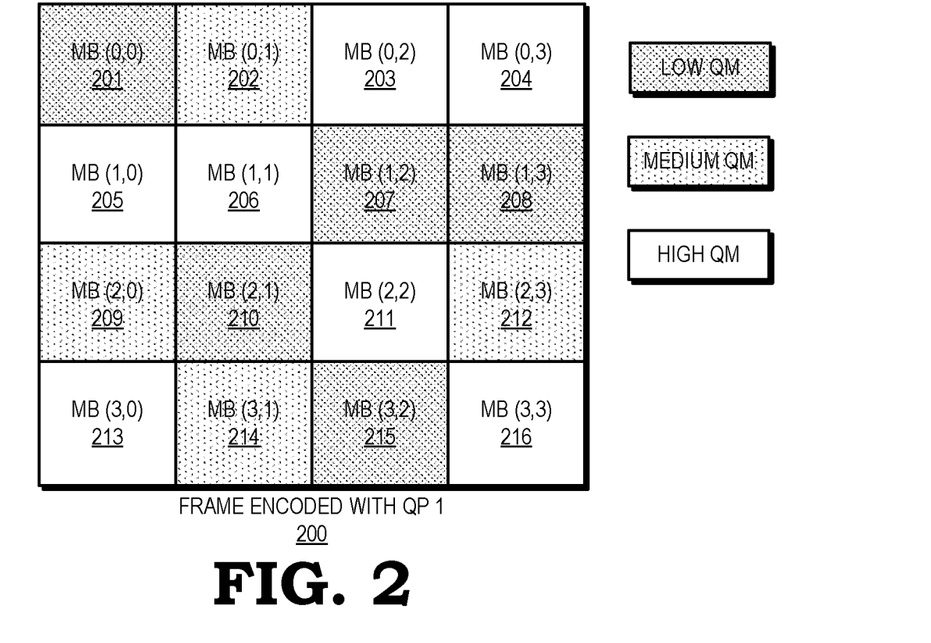
FIG. 2 is a diagram that illustrates quality metrics for macroblocks of a frame encoded with a first quantization parameter.

FIG. 2 is a diagram that illustrates quality metrics for macroblocks of a frame 200 encoded with the first QP 112 in accordance with some embodiments. The frame 200 includes macroblocks 201-216, with the coordinates of the macroblocks indicated as MB(x,y) wherein x indicates a row of macroblocks in the frame 200 and y indicates a column of macroblocks in the frame 200. In the illustrated example, when encoded with the first QP 112, macroblocks 201, 207, 208, 210, and 215 have low quality metrics, macroblocks 202, 209, 212, and 214 have medium quality metrics, and macroblocks 203, 204, 206, 211, 213, and 216 have high quality metrics.

Figure 3:
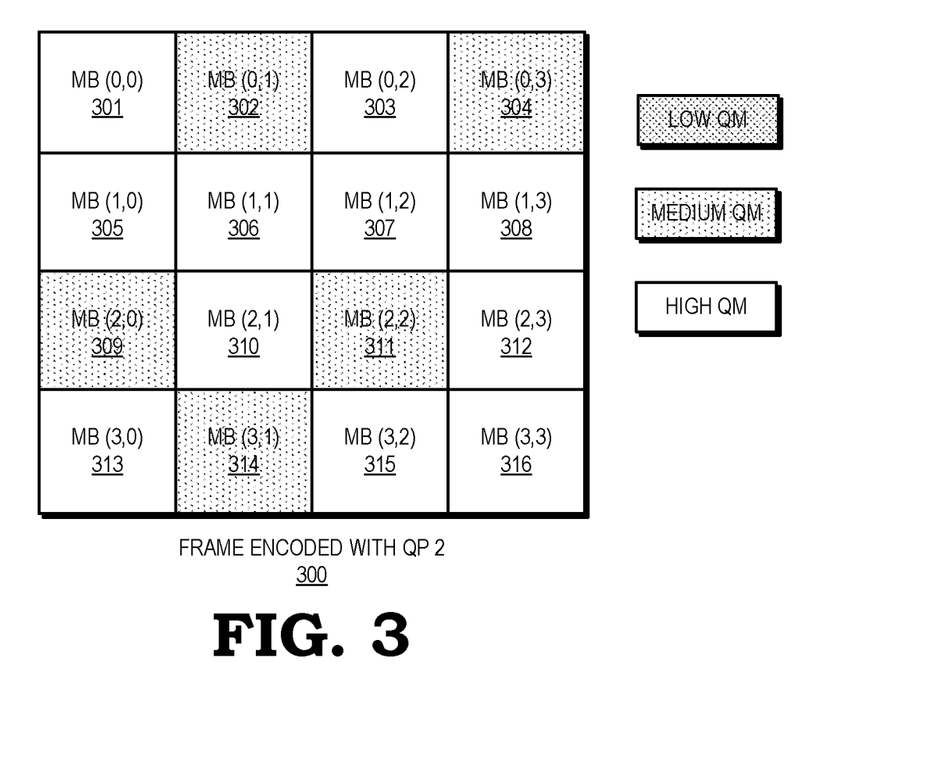
FIG. 3 is a diagram that illustrates quality metrics for macroblocks of a frame encoded with a second quantization parameter.

FIG. 3 is a diagram that illustrates quality metrics for blocks of a frame 300 encoded with the second QP 114. Similar to FIG. 2, frame 300 includes macroblocks 301-316, with the coordinates of the macroblocks indicated as MB(x, y) wherein x indicates a row of macroblocks in the frame 300 and y indicates a column of macroblocks in the frame 300. In the illustrated example, when encoded with the second QP 114, macroblocks 302, 304, 309, 311, and 314 have medium quality metrics, and macroblocks 301, 303, 305, 306, 307, 308, 310, 312, 313, 315, and 316 have high quality metrics.

Figure 4:
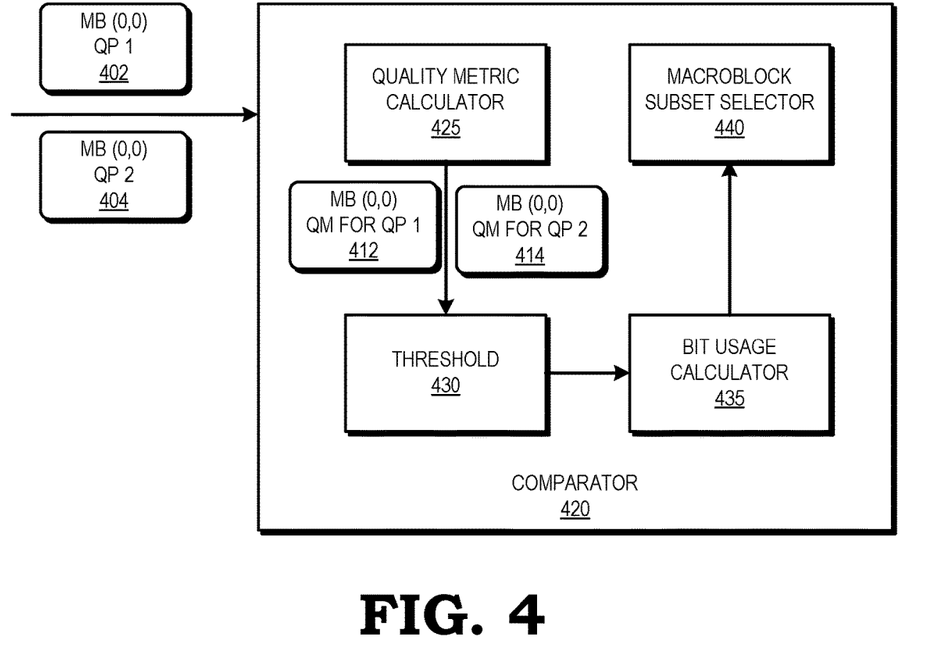
FIG. 4 is block diagram of a comparator of the multimedia system of FIG. 1 configured to select a subset of macroblocks of a frame for encoding with a second quantization parameter based on quality metrics and bit usages in accordance with some embodiments.

FIG. 4 is block diagram of a comparator 420 of the multimedia system 100 of FIG. 1 configured to select a subset of macroblocks of a frame for encoding with the second QP 114 based on quality metrics and bit usages in accordance with some embodiments. The comparator 420 is configured to analyze a macroblock 402 encoded with the first QP 112 and a corresponding macroblock 404 of the same frame and having the same coordinates as macroblock 402, encoded with the second QP 114. The quality metric calculator 425 measures a quality metric such as MSE for each of macroblocks 402 and 404 to determine a quality metric 412 for macroblock 402 and a quality metric 414 for macroblock 404. The quality metric calculator 425 compares the quality metric 412 to the quality metric 414 to determine a difference in quality metrics for the macroblocks 402 and 404. The bit usage calculator 435 is configured to determine how many bits were used to encode each of macroblock 402 with the first QP 112 and macroblock 404 with the second QP 114. The bit usage calculator 435 compares the bit usages to determine a difference in bit usage for encoding macroblock 402 versus macroblock 404.

The macroblock subset selector 440 compares the difference in quality metrics 412 and 414 for macroblocks 402 and 404 to the threshold 430 to identify whether the difference in quality metrics exceeds the threshold 430. If the difference in quality metrics exceeds the threshold 430, the macroblock subset selector 440 identifies the macroblock 404 for inclusion in the subset of macroblocks to be encoded with the second QP 114. The macroblock subset selector 440 further determines whether the difference in bit usage for encoding macroblock 402 versus macroblock 404 exceeds a second threshold (not shown). The identification by the macroblock subset selector 440 of macroblock 404 for inclusion in the subset of macroblocks to be encoded with the second QP 114 is based at least in part on whether the difference in bit usage for encoding macroblock 402 versus macroblock 404 exceeds the second threshold.

For example, if the macroblock subset selector 440 determines that the difference in quality metrics 412 and 414 exceeds the threshold 430 but also determines that the difference in bit usage for encoding macroblock 402 versus macroblock 404 exceeds the second threshold, in some embodiments, the macroblock subset selector 440 will not identify macroblock 404 for inclusion in the subset of macroblocks to be encoded with the second QP 114, because the cost is too high. Conversely, if the macroblock subset selector 440 determines that the difference in quality metrics 412 and 414 does not exceed the threshold 430 but also determines that the difference in bit usage for encoding macroblock 402 versus macroblock 404 does not exceed the second threshold, in some embodiments, the macroblock subset selector 440 will identify macroblock 404 for inclusion in the subset of macroblocks to be encoded with the second QP 114, because the cost is low.

Figure 5:
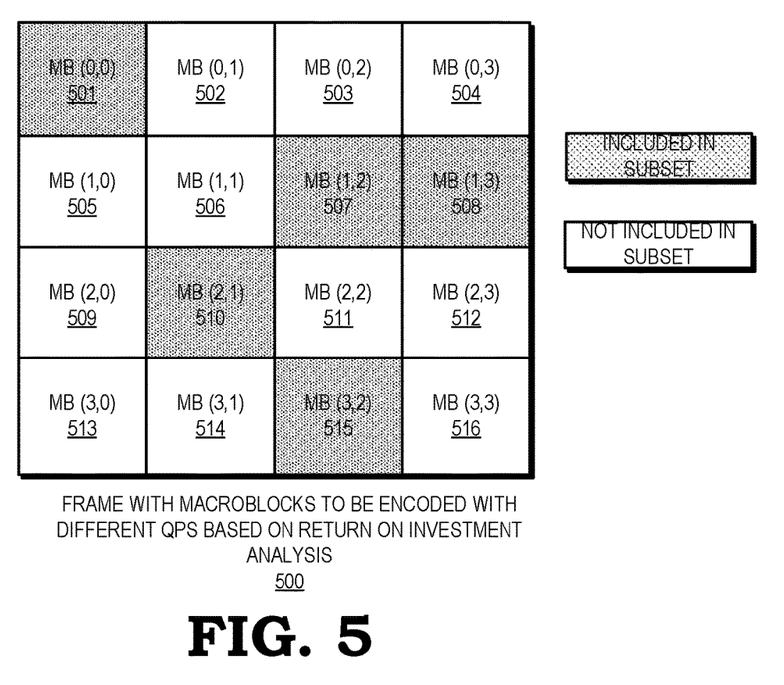
FIG. 5 is a diagram that illustrates a subset of macroblocks of a frame encoded with a second quantization parameter and the remainder of the macroblocks of the frame encoded with a first quantization parameter in accordance with some embodiments.

FIG. 5 is a diagram that illustrates a subset of blocks of a frame 500 selected to be encoded with the second QP 114 and the remainder of the blocks of the frame selected to be encoded with the first QP 112 in accordance with some embodiments. The macroblocks of FIG. 5 correspond to the macroblocks of FIGS. 2 and 3 with their associated quality metrics. In the illustrated example, macroblocks 501, 507, 508, 510, and 515 have been selected by the macroblock subset selector 440 for inclusion in the subset of macroblocks to be encoded with the second QP 114. As shown in FIG. 2, each of macroblocks 201, 207, 208, 210, and 215 of frame 200 had a low quality per the quality metric measurement when encoded with the first QP 112. As shown in FIG. 3, each of the corresponding macroblocks 301, 307, 308, 310, and 315 of frame 300 had a high quality per the quality metric measurement when encoded with the second QP 114. Thus each of these macroblocks showed a relatively high improvement in quality metrics when encoded with the second QP 114 versus the first QP 112. Accordingly, the macroblock subset selector 440 selects these macroblocks to be encoded with the second QP 114.

Figure 6:
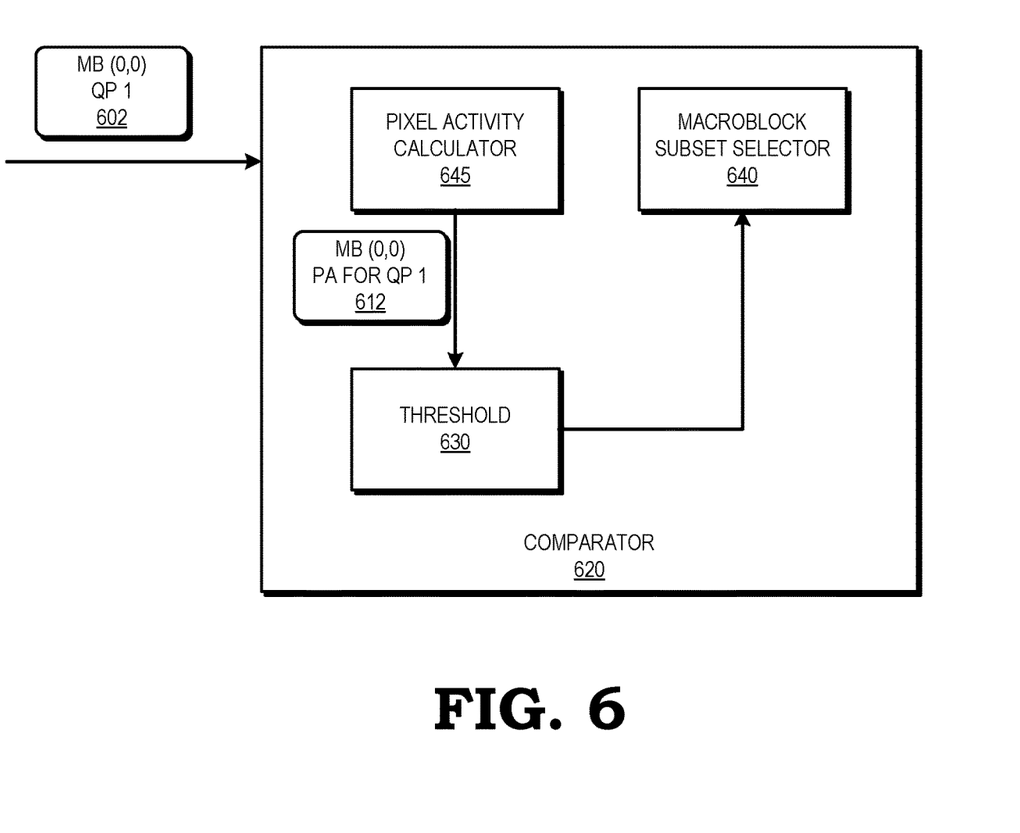
FIG. 6 is a block diagram of a comparator of the multimedia system of FIG. 1 configured to select a subset of macroblocks of a frame for encoding with a second quantization parameter based on pixel activities of the macroblocks in accordance with some embodiments.

FIG. 6 is a block diagram of a comparator 620 of the multimedia system 100 of FIG. 1 configured to select a subset of macroblocks of a frame for encoding with a second QP 114 based on pixel activities of the blocks in accordance with some embodiments. In each of the examples illustrated in FIGS. 1-5, the encoder 110 encodes a frame in multiple passes, using a different QP for each pass. By contrast, in some embodiments, the comparator 620 identifies macroblocks for inclusion in the subset of macroblocks to be encoded with a higher QP based on a prediction of which macroblocks will show the greatest improvement in quality when encoded with the higher QP, without the requiring the encoder 110 to first encode the frame using different QPs in multiple passes.

In the embodiment illustrated in FIG. 6, the comparator 620 predicts which macroblocks will show the greatest improvement in quality when encoded with the higher QP based on pixel activities for each macroblock. Many video processing algorithms such as those used for texture analysis calculate a metric such as pixel activity within blocks. For example, pixel activity such as variations of pixel intensities within a block may be used to detect edges, repeating patterns, and other structures or objects in an image. Pixel activity can be measured using various metrics such as, for example, using a gray-level co-occurrence matrix, a two-dimensional spatial mean gradient, wavelet or other transforms, discrete cosine function, or average value within a block.

The comparator 620 is configured to analyze a macroblock 602 encoded with a first QP 112. The comparator 620 includes a pixel activity calculator 645, a threshold 630, and a macroblock subset selector 640. The pixel activity calculator 645 calculates the level of pixel activity 612 for the macroblock 602. The macroblock subset selector 640 compares the level of pixel activity 612 to the threshold 630. If the level of pixel activity 612 exceeds the threshold 630, the macroblock subset selector 640 identifies the macroblock 602 for inclusion in the subset of macroblocks to be encoded with the second QP 114. If the level of pixel activity 612 is lower than the threshold 630, the macroblock subset selector 640 does not include the macroblock 602 for inclusion in the subset of macroblocks to be encoded with the second QP 114. Thus, macroblocks with lower pixel activities will be encoded with a lower QP. In some embodiments, the macroblock subset selector 640 identifies a macroblock for inclusion in the subset of macroblocks to be encoded with the second QP 114 even though the level of pixel activity 612 does not exceed the threshold 630 (i.e., even for quiet, or flat, areas). In some embodiments, the determination of whether to include a macroblock in the subset of macroblocks to be encoded with the second QP 114 based on the level of pixel activity 612 is based on a default setting of the macroblock subset selector 640, whereas in other embodiments, the determination is adaptable and made on a per-macroblock basis.

Figure 7:
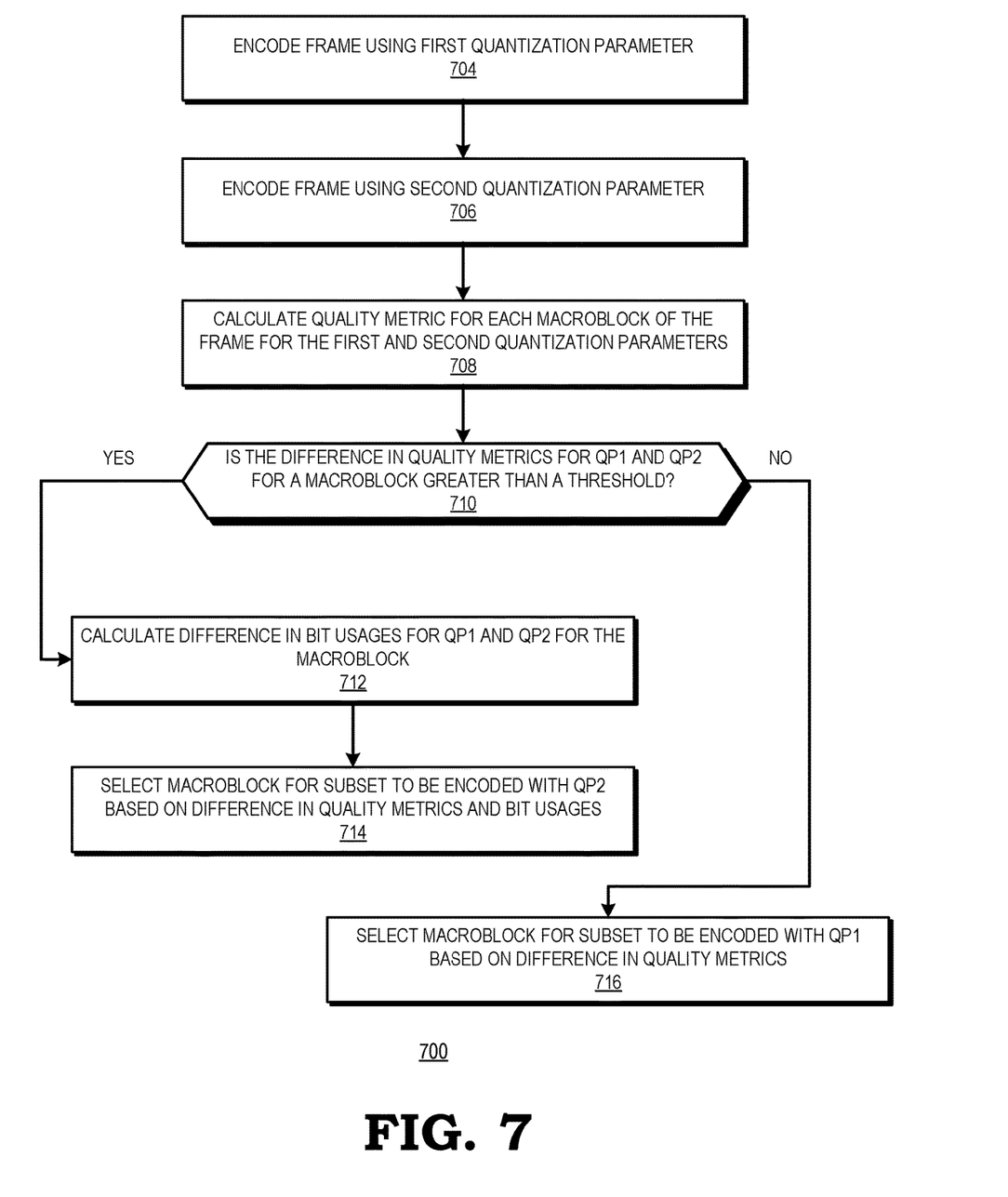
FIG. 7 is a flow diagram illustrating a method for selecting a subset of macroblocks of a frame for encoding with a second quantization parameter based on quality metrics and bit usages in accordance with some embodiments.

FIG. 7 is a flow diagram illustrating a method 700 implemented by the multimedia system 100 of FIG. 1 for selecting a subset of blocks of a frame for encoding with a second QP 114 based on quality metrics and bit usages in accordance with some embodiments. At block 704, the encoder 110 encodes the frame 102 using the first QP 112 to generate encoded frame 122. At block 706, the encoder 110 encodes the frame 102 using the second QP 114 to generate encoded frame 124. At block 708, the quality metric calculator 125 measures a quality metric such as MSE for each macroblock of the encoded frame 122 and the encoded frame 124 and compares the measured quality metrics to determine a difference in quality metrics for each macroblock of encoded frames 122 and 124. At block 710, the macroblock subset selector 140 compares the difference in quality metrics for each macroblock of the encoded frames 122 and 124 to the threshold 130 to determine if the difference in quality metrics exceeds the threshold 130. If the difference in quality metrics for a given macroblock does not exceed the threshold 130, the method flow proceeds to block 716. At block 716, the macroblock subset selector 140 selects the macroblock for inclusion in a subset of macroblocks to be encoded with the first QP 112.

If, at block 710, the macroblock subset selector 140 determines that the difference in quality metrics for a given macroblock exceeds the threshold 130, the method flow proceeds to block 712. At block 712, the bit usage calculator 135 calculates the difference in bit usages for the macroblock when encoded with the second QP 114 versus the first QP 112. At block 714, the macroblock subset selector 140 selects the macroblock for inclusion in the subset of macroblocks to be encoded with the second QP 114 based on the increase in quality metrics and the difference in bit usages for the macroblock when encoded with the second QP 114 versus the first QP 112.

Figure 8:
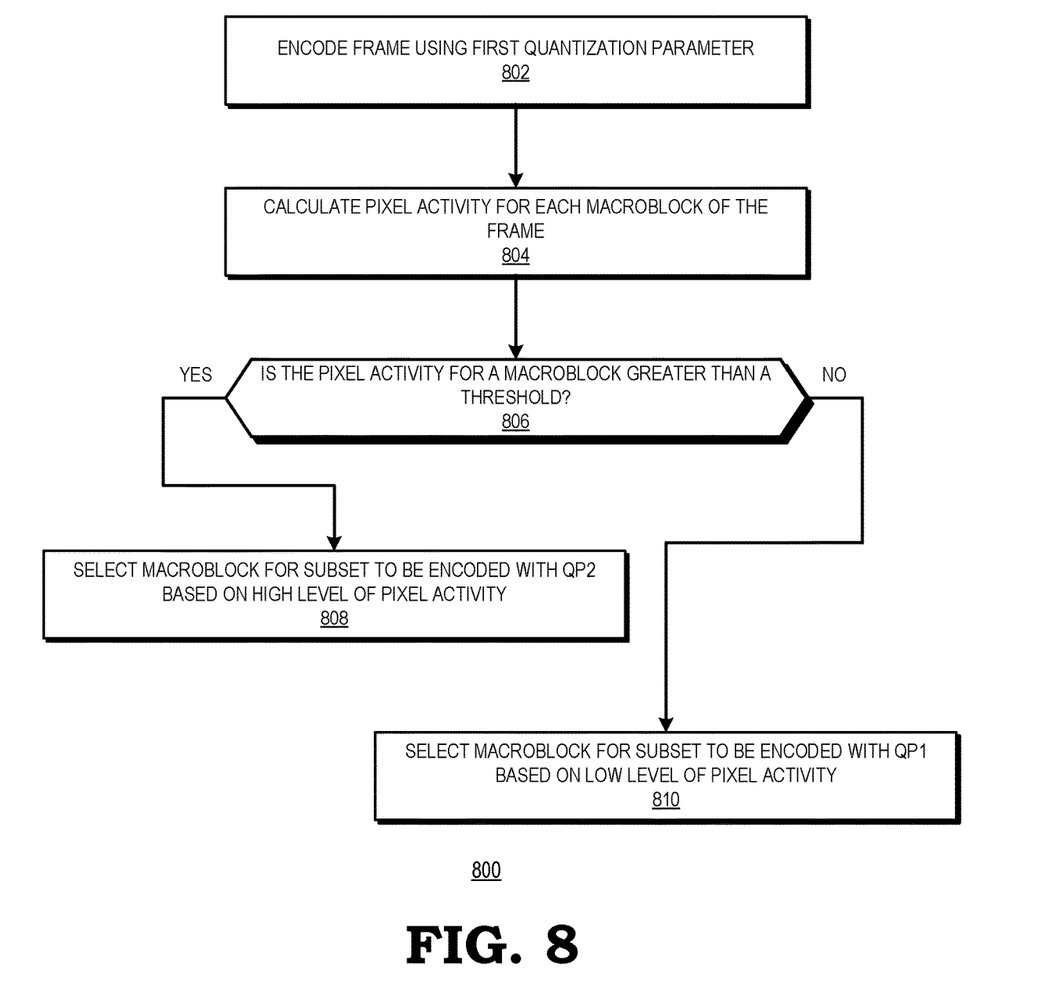
FIG. 8 is a flow diagram illustrating a method for selecting a subset of macroblocks of a frame for encoding with a second quantization parameter based on pixel activities of the macroblocks in accordance with some embodiments.

FIG. 8 is a flow diagram illustrating a method 800 implemented by the comparator 620 of FIG. 6 of the multimedia system 100 of FIG. 1 for selecting a subset of macroblocks of a frame for encoding with a second QP 114 based on pixel activities of the macroblocks in accordance with some embodiments. At block 802, the encoder 110 encodes the frame 102 using the first QP 112. At block 804, the pixel activity calculator 645 calculates the level of pixel activity of each macroblock of the frame 102. At block 806, the macroblock subset selector 640 determines whether the level of pixel activity for each macroblock exceeds a threshold 630. If, at block 806, the macroblock subset selector 640 determines that the level of pixel activity for a given macroblock exceeds the threshold 630, the method flow proceeds to block 808. At block 808, the macroblock subset selector 640 selects the macroblock for inclusion in the subset of macroblocks to be encoded with the second QP 114. If, at block 806, the macroblock subset selector 640 determines that the level of pixel activity for a given macroblock does not exceed the threshold 630, the method flow proceeds to block 810. At block 810, the macroblock subset selector 640 selects the macroblock for inclusion in the subset of macroblocks to be encoded with the first QP indicated by block 112.

In some embodiments, the apparatus and techniques described above are implemented in a system having one or more integrated circuit (IC) devices (also referred to as integrated circuit packages or microchips), such as the multimedia system described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software comprises one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium is in source code, assembly language code, object code, or other instruction format that is interpreted or otherwise executable by one or more processors.

Note that not all of the activities or elements described above in the general description are required, that a portion of a specific activity or device is not necessarily required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   predicting whether a first quality metric for a first subset of portions of a first frame, when encoded with a first quantization parameter, will be lower than a second quality metric for the first subset of portions of the first frame, when encoded with a second quantization parameter, by more than a threshold value, wherein the second quantization parameter is lower than the first quantization parameter;

selecting the first subset of portions of the first frame to encode with the second quantization parameter based on the prediction; and encoding the first subset of portions of the first frame with the second quantization parameter.

2. The method of claim 1, wherein predicting is based on levels of pixel activity in each portion of the first frame.

3. The method of claim 1, further comprising encoding a second subset of portions of the first frame with the first quantization parameter, the second subset different from the first subset.

4. The method of claim 1, wherein selecting the first subset of portions is further based on a comparison of a number of bits used to encode each portion of the first frame using the second quantization parameter with the number of bits used to encode each portion of the first frame using the first quantization parameter.

5. The method of claim 1, wherein the first quality metric and the second quality metric are based on an average of squares of differences between the first frame and the first frame encoded with one of the first quantization parameter or the second quantization parameter.

6. The method of claim 1, wherein the first quantization parameter is selected based on a second frame preceding the first frame.

7. The method of claim 1, further comprising:
predicting whether encoding a second subset of portions of the first frame with a third quantization parameter higher than the first quantization parameter will result in a third quality metric lower than the first quality metric; and
encoding the second subset of portions of the first frame with the third quantization parameter based on the prediction.

8. A method, comprising:
encoding a first subset of portions of a first frame with a first quantization parameter;
selecting a second subset of portions of the first frame to encode with a second quantization parameter lower than the first quantization parameter, the second subset different from the first subset, in response to predicting that a quality metric for the second subset of portions when encoded with the second quantization parameter will be greater than the quality metric for the second subset of portions when encoded with the first quantization parameter by more than a threshold value; and
encoding the second subset of portions of the first frame with the second quantization parameter.

9. The method of claim 8, wherein selecting the second subset of portions is further based on a comparison of a number of bits used to encode each portion of the first frame using the second quantization parameter with the number of bits used to encode each portion of the first frame using the first quantization parameter.

10. The method of claim 8, wherein the quality metric is based on an average of squares of differences between the first frame and the first frame encoded with one of the first quantization parameter or the second quantization parameter.

11. The method of claim 8, wherein the first quantization parameter is selected based on a second frame preceding the first frame.

12. The method of claim 8, further comprising:
calculating a quality metric for each portion of the first frame encoded with a third quantization parameter higher than the first quantization parameter;
comparing the quality metric for portions encoded with the first quantization parameter to the quality metric for portions encoded with the third quantization parameter for each portion;
selecting a third subset of portions of the first frame to encode with the third quantization parameter based on the comparison; and
encoding the third subset of portions of the first frame with the third quantization parameter.

13. The method of claim 8, further comprising predicting whether a quality metric for the second subset of portions when encoded with the second quantization parameter will be greater than the quality metric for the second subset of portions when encoded with the first quantization parameter by more than a threshold value based on a level of pixel activity for the second subset of portions.

14. The method of claim 13, wherein the level of pixel activity is based on one of: a gray-level co-occurrence matrix, a spatial gradient, wavelet transform, discrete cosine function, or average value within a portion.

15. A device, comprising:
a comparator to:
predict if a first quality metric, which is based on a first method of measurement for portions of a first frame when encoded with a first quantization parameter, will exceed a second quality metric, which is based on the first method of measurement for portions of the first frame when encoded with a second quantization parameter that is lower than the first quantization parameter; and
select a first subset of portions of the first frame for which a difference between the first quality metric identified for the first subset of portions of the first frame, when encoded with the first quantization parameter, and the second quality metric identified for the first subset of portions of the first frame, when encoded with the second quantization parameter, is predicted to exceed a specified threshold; and
an encoder to encode the selected first subset of portions with the second quantization parameter.

16. The device of claim 15, wherein the comparator is further to:
calculate a number of bits used to encode each portion of the first frame using the first quantization parameter;
calculate a number of bits used to encode each portion of the first frame using the second quantization parameter; and
select the first subset of portions further based on a comparison of the number of bits used to encode each portion of the first frame using the second quantization parameter with the number of bits used to encode each portion of the first frame using the first quantization parameter.

17. The device of claim 15, wherein the first method of measurement is based on an average of squares of differences between the first frame and the first frame encoded with one of the first quantization parameter or the second quantization parameter.

18. The device of claim 15, wherein the first quantization parameter is selected based on a second frame preceding the first frame.

19. A device, comprising:
a processor to:
identify a first quality metric based on a first method of measurement for portions of a first frame when encoded with a first quantization parameter;

identify a second quality metric based on the first method of measurement for portions of the first frame when encoded with a second quantization parameter that is lower than the first quantization parameter; and select a first subset of portions of the first frame for which a difference between the first quality metric and a second quality metric exceeds a specified threshold;

predict, based on a level of pixel activity for the first subset of portions, whether a quality metric for the first subset of portions, when encoded with a second quantization parameter, will be greater than the quality metric for the first subset of portions, when encoded with the first quantization parameter, by more than a threshold value; and select the first subset of portions further based on the prediction; and an encoder to encode the selected first subset of portions with the second quantization parameter.

20. The device of claim 19, wherein the level of pixel activity is based on one of: a gray-level co-occurrence matrix, a spatial gradient, wavelet transform, discrete cosine function, or average value within a portion.

* * * * *

UNITED STATES PATENT AND TRADEMARK OFFICE
CERTIFICATE OF CORRECTION

| | | |
|---|---|---|
| PATENT NO. | : 11,997,275 B2 | Page 1 of 1 |
| APPLICATION NO. | : 16/113302 | |
| DATED | : May 28, 2024 | |
| INVENTOR(S) | : Boris Ivanovic and Mehdi Saeedi | |

It is certified that error appears in the above-identified patent and that said Letters Patent is hereby corrected as shown below:

On the Title Page

At Item (73), please correct "Assignee: AT Technologies" to be --Assignee: ATI Technologies--

Signed and Sealed this
Twentieth Day of May, 2025

Coke Morgan Stewart
*Acting Director of the United States Patent and Trademark Office*